United States Patent
Lu et al.

(10) Patent No.: US 12,451,278 B2
(45) Date of Patent: Oct. 21, 2025

(54) INTEGRATED INDUCTOR AND POWER MODULE

(71) Applicant: Delta Electronics (Shanghai) Co., Ltd., Shanghai (CN)

(72) Inventors: Zengyi Lu, Shanghai (CN); Tianding Hong, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 894 days.

(21) Appl. No.: 17/457,919

(22) Filed: Dec. 7, 2021

(65) Prior Publication Data
US 2022/0208425 A1    Jun. 30, 2022

(30) Foreign Application Priority Data

Dec. 24, 2020   (CN) .......................... 202011546141.5

(51) Int. Cl.
*H01F 27/24* (2006.01)
*H01F 3/14* (2006.01)
(Continued)

(52) U.S. Cl.
CPC ................ *H01F 3/14* (2013.01); *H01F 27/24* (2013.01); *H01F 38/023* (2013.01); *H02M 1/4225* (2013.01); *H01F 2038/026* (2013.01)

(58) Field of Classification Search
CPC .......... H01F 3/14; H01F 27/24; H01F 38/023; H01F 2038/026; H01F 37/00;
(Continued)

(56) References Cited

U.S. PATENT DOCUMENTS 7,612,640 B2 * 11/2009 Sano ..................... H01F 27/255
                                                            336/83
9,406,419 B2    8/2016 Njiende T. et al.
(Continued)

FOREIGN PATENT DOCUMENTS

CN          102314998 B      6/2013
CN          103222344 A      7/2013
(Continued)

OTHER PUBLICATIONS

Zumel et al., "Magnetic integration for interleaved converters," IEEE Applied Power Electronics Conference, Miami Beach, Fl, USA, 2003, pp. 1143-1149, vol. 2, doi: 10.1109/APEC.2003.1179360 (Year: 2003).

*Primary Examiner* — Tuyen T Nguyen
(74) *Attorney, Agent, or Firm* — CKC & Partners Co., LLC

(57) ABSTRACT

The application provides an integrated inductor and a power module. The integrated inductor includes a magnetic core, comprising: two winding columns disposed in parallel, each provided with an air gap; a first cover plate disposed under the two winding columns; a second cover plate disposed above the two winding columns, and opposite to the first cover plate; and a common column connected between the first and second cover plates, and disposed on one or both sides of the two winding columns; and two windings are respectively wound on the two winding columns, wherein a line frequency current component of a current flowing through each of the two windings surrounds the winding columns in the same direction, a phase of high-frequency current component of the current flowing through each of the two windings differs by 180°, and a coupling coefficient between the two windings is less than 0.1.

16 Claims, 12 Drawing Sheets

(51) Int. Cl.
*H01F 38/02* (2006.01)
*H02M 1/42* (2007.01)

(58) Field of Classification Search
CPC ... H01F 27/306; H02M 1/4225; H02M 3/003;
H02M 3/1586; H02M 3/155
See application file for complete search history.

(56) References Cited

U.S. PATENT DOCUMENTS

| | | |
|---|---|---|
| 2010/0001822 A1 | 1/2010 | Li et al. |
| 2012/0081204 A1 | 4/2012 | Garrity et al. |
| 2017/0214314 A1 | 7/2017 | Jitaru et al. |
| 2017/0345541 A1* | 11/2017 | Yang ................... H01F 17/04 |
| 2020/0312595 A1 | 10/2020 | Rippel et al. |
| 2021/0110970 A1 | 4/2021 | Kotani et al. |
| 2021/0193366 A1 | 6/2021 | Wang et al. |
| 2021/0249960 A1 | 8/2021 | Jin et al. |
| 2022/0208425 A1 | 6/2022 | Lu et al. |

FOREIGN PATENT DOCUMENTS

| | | |
|---|---|---|
| CN | 102326216 B | 3/2016 |
| CN | 105448501 A | 3/2016 |
| CN | 106057401 A | 10/2016 |
| CN | 205959741 U | 2/2017 |
| CN | 103595367 B | 3/2017 |
| CN | 106998142 A | 8/2017 |
| CN | 108777220 A | 11/2018 |
| CN | 110492754 A | 11/2019 |
| CN | 110581003 A | 12/2019 |
| CN | 111554471 A | 8/2020 |
| DE | 102016201258 A1 | 8/2017 |
| GB | 567967 A | 3/1945 |
| GB | 786578 A | 11/1957 |
| GB | 1111120 A | 4/1968 |
| JP | 08264320 A * | 10/1996 |

* cited by examiner

High-frequency magnetic fluxes on integrated inductor

Line A: $\Delta\varphi_a(t)$
Line B: $\Delta\varphi_b(t)$
Line C: $\Delta\varphi_c(t)$
Line D: $\Delta\varphi_a(t)+\Delta\varphi_b(t)+\Delta\varphi_c(t)$

INTEGRATED INDUCTOR AND POWER MODULE

CROSS-REFERENCE TO RELATED APPLICATIONS

This non-provisional application claims priority under 35 U.S.C. § 119(a) on Patent Application No. 202011546141.5 filed in P.R. China on Dec. 24, 2020, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The application relates to an integrated inductor and a power module, and particularly to an integrated inductor and a power module capable of reducing loss of a magnetic core at high frequency.

BACKGROUND

In development of a high power density power supply, inductors become more and more important. The inductors occupy a large proportion of volumn, weight and loss in the power supply. Magnetic integration is the main means for reducing the volumn of the inductors. For example, FIGS. 1A and 1B illustrate a two-inductor integrated element in the prior art.

As shown in FIGS. 1A and 1B, the two-inductor integrated element 10 in the prior art has two winding columns 11 and 12, and a common column 13 is located between the two winding columns 11 and 12. Moreover, windings 14 and 15 of the inductors are wound onto the winding columns 11 and 12 in opposite directions, respectively. For example, the winding 14 is wound on the winding column 11 clockwise, and the winding 15 is wound on the winding column 12 anticlockwise. As for the two inductors wound in such way, magnetic fluxes $\varphi_A$ and $\varphi_B$ generated by line frequency current components of the two inductors are overlapped reversely on the common column 13 to reduce a magnitude of synthesized magnetic flux on the common column 13, such that a size of the common column can be minimized to a certain extent. However, one disadvantage of the above is the reverse overlap effect only exist on the common column only, but does exist on an upper cover plate 16 and a lower cover plate 17 of the magnetic core, and it is impossible to reduce thicknesses of the upper and lower cover plates. Meanwhile, since magnetic fluxes generated by high-frequency current components of the two inductors are overlapped on the common column 13, the magnetic core loss is large in high frequency applications.

Therefore, an integrated inductor particularly applicable to high frequency applications and also capable of reducing volumn is required in the industry.

SUMMARY

An object of the invention is to provide an integrated inductor and a power module having the same, which are particularly applicable to high frequency applications, thereby solving the disadvantage of large loss of the magnetic core of the current integrated inductor in high frequency applications. Moreover, the integrated inductor and the power module having the same in the invention can remarkably reduce the magnetic core loss while reducing volume when being applicable to high frequency applications.

To achieve the object, embodiments of the application provides an integrated inductor, comprising: a magnetic core, comprising: two winding columns being in parallel, each provided with an air gap; a first cover plate disposed at a bottom of the two winding columns; a second cover plate disposed at a top of the two winding columns, and opposite to the first cover plate; and a common column connected between the first cover plate and the second cover plate, and disposed on one side or both sides of the two winding columns; and two windings are respectively wound on the two winding columns, wherein a line frequency current component of a current flowing through each of the two windings surrounds the winding columns in the same direction, phase difference between high-frequency current component of the current flowing through each of the two windings is 180°, and a coupling coefficient between the two windings is less than 0.1.

In one embodiment of the application, the common column extends from a position corresponding to the first winding column of the two winding columns to a position corresponding to the last winding column of the two winding columns.

In one embodiment of the application, the common column is an integrated rectangular shape, or the common column is formed with a notch.

In one embodiment of the application, the first cover plate and the second cover plate are both integrated rectangular shapes, or the first cover plate and the second cover plate are both formed with notches.

In one embodiment of the application, the integrated inductor functions as two integrated PFC inductors.

To achieve the object, embodiments of the application further provides a power module, comprising an input end, a rectifier circuit, two Boost circuits and an output end; wherein the input end is configured to receive an input voltage, the output end is configured to output an output voltage, the rectifier circuit is electrically connected to the input end, and the two Boost circuits are connected in parallel, and electrically connected between the rectifier circuit and the output end; wherein the two Boost circuits comprise the integrated inductor in the above embodiment.

In one embodiment of the application, each of the Boost circuits comprises a switch, a diode and one inductor in the integrated inductor; in each of the Boost circuits, a first end of the inductor is electrically connected to the rectifier circuit, a second end of the inductor, a first end of the switch and a first end of the diode are electrically connected together; a second end of the switch is electrically connected to a negative electrode of the output end; and a second end of the diode is electrically connected to a positive electrode of the output end.

To achieve the object, the application further provides an integrated inductor, comprising: a magnetic core, comprising: N winding columns being in parallel, each provided with an air gap, where N is an integer greater than or equal to 3; a first cover plate disposed at a bottom of the N winding columns; a second cover plate disposed at a top of the N winding columns, and opposite to the first cover plate; and a common column connected between the first cover plate and the second cover plate, disposed on one side or both sides of the N winding columns, and extending from a position corresponding to the first winding column of the N winding columns to a position of the last winding column of the N winding columns; and N windings are respectively wound on the N winding columns, wherein a line frequency current component of a current flowing through each of the N windings surrounds the winding columns in the same direction, phase difference between high-frequency current component of the current flowing through each of the N windings is 360°/N, and a coupling coefficient between two of the N windings is less than 0.1.

In one embodiment of the application, N=3, and the phase difference between high-frequency current component of the current flowing through each of the three windings is 120°.

In one embodiment of the application, the air gap is disposed in the center and/or at one end of each of the winding columns.

In one embodiment of the application, the N winding columns are arranged sequentially along a straight line.

In one embodiment of the application, the common column is an integrated rectangular shape, or the common column is formed with a notch.

In one embodiment of the application, the first cover plate and the second cover plate are both integrated rectangular shapes, or the first cover plate and the second cover plate are both formed with notches.

In one embodiment of the application, the integrated inductor functions as N integrated PFC inductors.

To achieve the object, embodiments of the application further provides a power module, comprising an input end, a rectifier circuit, N Boost circuits and an output end; wherein the input end is configured to receive an input voltage, the output end is configured to output an output voltage, the rectifier circuit is electrically connected to the input end, and the N Boost circuits are connected in parallel, and electrically connected between the rectifier circuit and the output end; wherein the N Boost circuits comprise the integrated inductor in the above embodiment.

In one embodiment of the application, each of the Boost circuits comprises a switch, a diode and one inductor in the integrated inductor; in each of the Boost circuits, a first end of the inductor is electrically connected to the rectifier circuit, a second end of the inductor, a first end of the switch and a first end of the diode are electrically connected together, a second end of the switch is electrically connected to a negative electrode of the output end, and a second end of the diode is electrically connected to a positive electrode of the output end.

BRIEF DESCRIPTION OF THE DRAWINGS

Since embodiments can explicitly explain the features of the application, more accurate description of the foregoing briefly generalized disclosures can be obtained with reference to the examples, and some examples are illustrated in the drawings. However, it shall be noticed that the drawings only illustrate exemplary examples, but shall not limit extent of the application, and the application can allow other equivalent examples.

DETAILED DESCRIPTION

Hereinafter specific technical solutions of the application are described in details with reference to the accompanying drawings.

FIRST EXAMPLE

Figure 2:
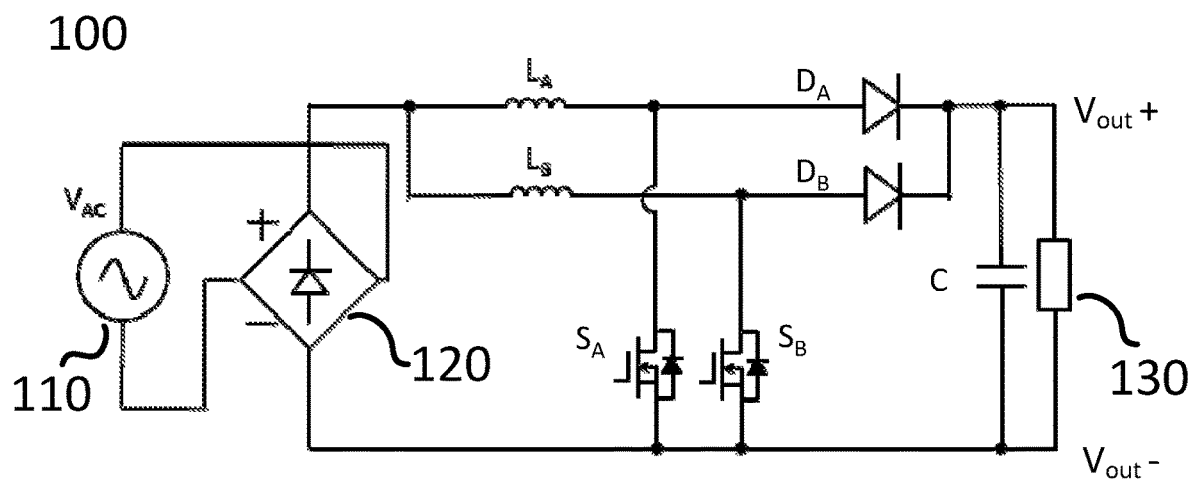
FIG. 2 illustrates a circuit diagram of a power module according to a first example of the application.

Please refer to FIG. 2, it illustrates a circuit diagram of a power module 100 according to a first example of the application. The power module 100 has an input end 110, a rectifier circuit 120, an output end 130 and multiple, such as, two Boost circuits connected in parallel. The input end 110 includes a positive electrode $V_{AC}+$ and a negative electrode $V_{AC}-$, and the output end 130 includes a positive electrode $V_{out}+$ and a negative electrode $V_{out}-$. The input end 110 is configured to receive an input voltage $V_{AC}$ from a single-phase AC power supply, the output end 130 is configured to supply an output voltage $V_{out}$, and the rectifier circuit 120 is electrically connected to the input end 110. The multiple Boost circuits are connected between the rectifier circuit 120 and the output end 130.

The circuit of the power module 100 shown in FIG. 2 has two Boost circuits connected in parallel, and each of the Boost circuits includes a switch, a diode and an inductor. For example, as shown in FIG. 2, the first Boost circuit of the two Boost circuits connected in parallel consists of a switch $S_A$, a diode $D_A$ and an inductor $L_A$, and the second Boost circuit consists of a switch $S_B$, a diode $D_B$ and an inductor $L_B$. In the first Boost circuit, a first end of the inductor $L_A$ is electrically connected to the rectifier circuit 120, a second end of the inductor $L_A$, a first end of the switch $S_A$ and a first end of the diode $D_A$ are electrically connected together, for example, electrically connected to a node $Q_A$, a second end of the switch $S_A$ is electrically connected to the negative electrode $V_{out}-$ of the output end 130, and a second end of the diode $D_A$ is electrically connected to the positive electrode $V_{out}+$ of the output end 130. In the second Boost circuit, a first end of the inductor $L_B$ is electrically connected to the rectifier circuit 120, a second end of the inductor $L_B$, a first end of the switch $S_B$ and a first end of the diode $D_B$ are electrically connected together, for example, electrically connected to a node $Q_B$, a second end of the switch $S_B$ is electrically connected to the negative electrode $V_{out}-$ of the output end 130, and a second end of the diode $D_B$ is electrically connected to the positive electrode $V_{out}+$ of the output end 130. The inductors $L_A$ and $L_B$ of the two Boost circuits function as PFC inductors in the power module 100, and currents flowing through the inductors $L_A$ and $L_B$ have line frequency current components and high-frequency current components, where the directions of the line frequency current components of the inductors $L_A$ and $L_B$ are the same.

Figure 1A:
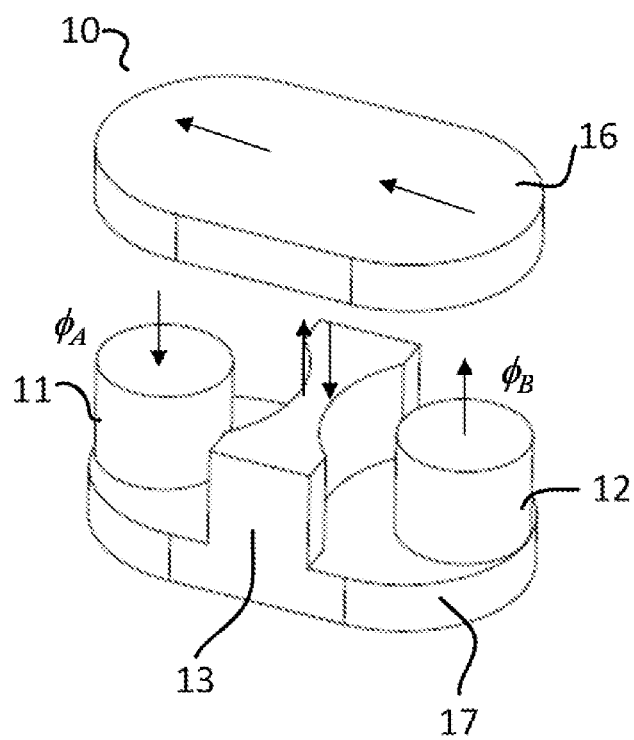
FIGS. 1A and 1B illustrate schematic diagrams of a two-inductor integrated element in the prior art.
Figure 1B:
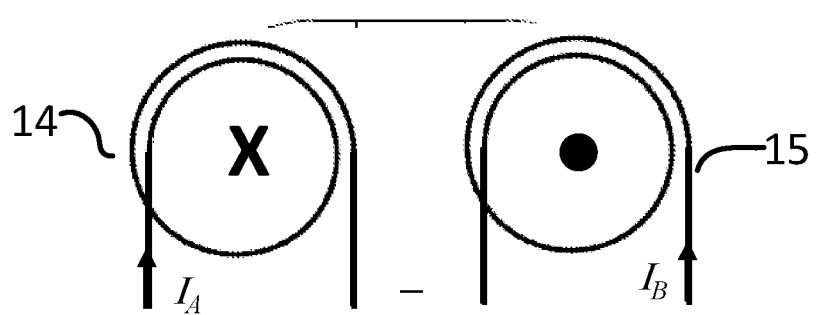

As stated previously, if windings in the inductors $L_A$ and $L_B$ are wound on the winding columns of the integrated inductor shown in FIGS. 1A and 1B, when the high-frequency current components of the currents flowing through the inductors $L_A$ and $L_B$ are of high frequency (e.g., greater than 100 kHz), magnetic fluxes generated by the high-frequency current components have large magnetic core loss on such integrated inductor.

Figure 3A:
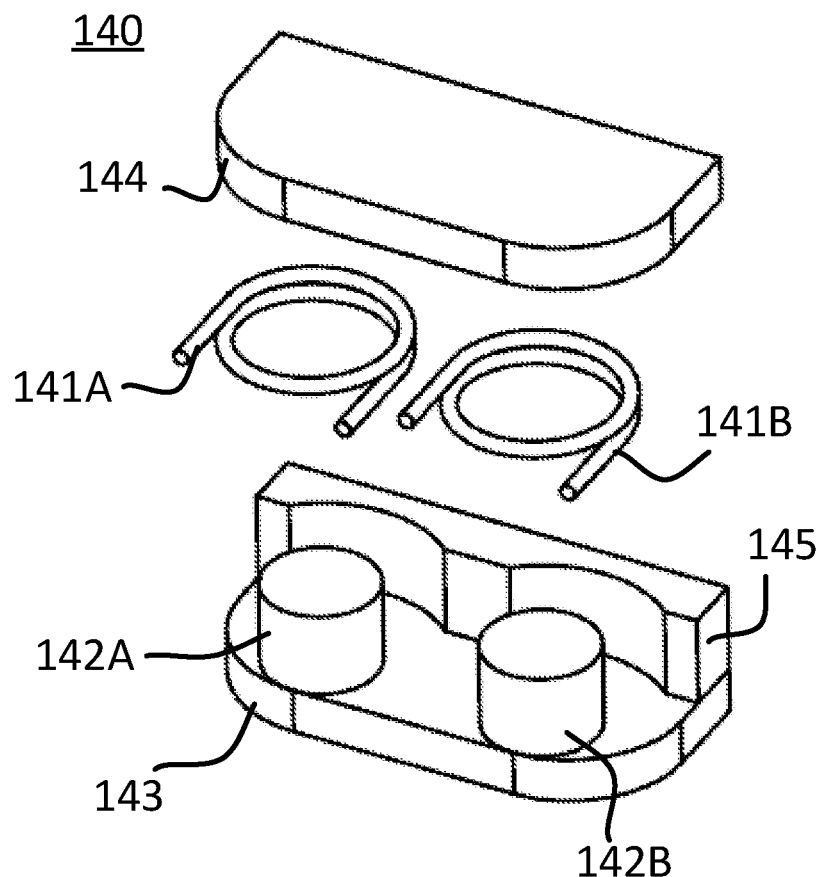
FIG. 3A illustrates an exploded diagram of an integrated inductor applied to the power module shown in FIG. 2.
Figure 3B:
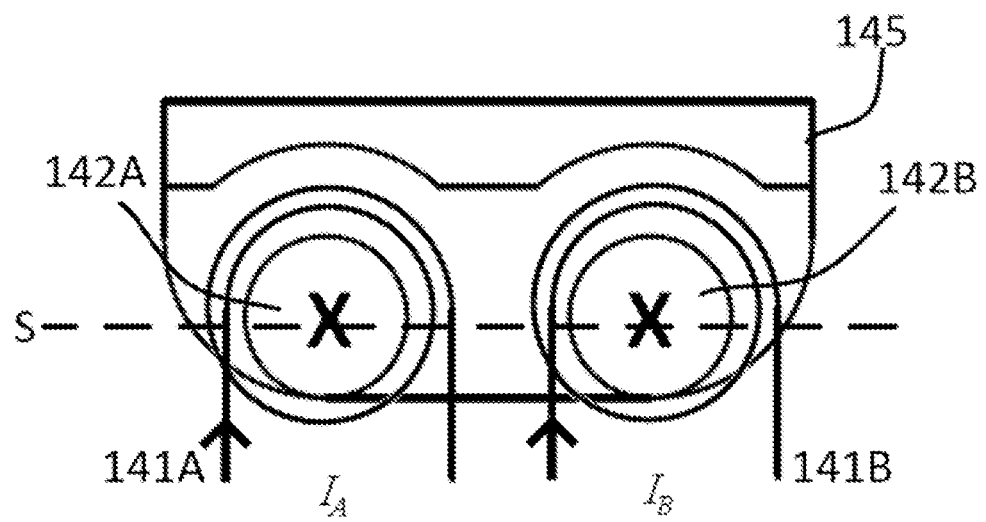
FIG. 3B illustrates a top view of the integrated inductor in FIG. 3A.

FIG. 3A illustrates an exploded diagram of an integrated inductor 140 applied to the power module 100 shown in FIG. 2. FIG. 3B illustrates a top view of the integrated inductor 140, where a second cover plate 144 is omitted. The integrated inductor 140 functions as the inductors $L_A$ and $L_B$ in the power module 100, i.e., two integrated PFC inductors.

The integrated inductor 140 has a magnetic core and two windings 141A and 141B. The magnetic core includes two winding columns 142A and 142B, a first cover plate 143 disposed at a bottom of the winding columns 142A and 142B, a second cover plate 144 disposed at a top of the winding columns 142A and 142B, and opposite to the first cover plate 143, and a common column 145. The two winding columns 142A and 142B are in parallel, and provided with air gaps. Since the power module 100 has two inductors $L_A$ and $L_B$, the two windings 141A and 141B respectively correspond to the inductors $L_A$ and $L_B$. The two winding columns 142A and 142B are arranged sequentially along a line S, and are connected between the first cover plate 143 and the second cover plate 144. In the integrated inductor 140, the common column 145 is connected between the first cover plate 143 and the second cover plate 144, and is located on one side of the winding columns 142A and 142B (or the line S). The common column 145 is formed as a substantial rectangular shape to extend from a position corresponding to the winding column 142A (i.e., a lateral position of the winding column 142A) to a position corresponding to the winding column 142B (i.e., a lateral position of the winding column 142B). In other examples, position and shape of the common column 145 also can be other forms.

Figure 3C:
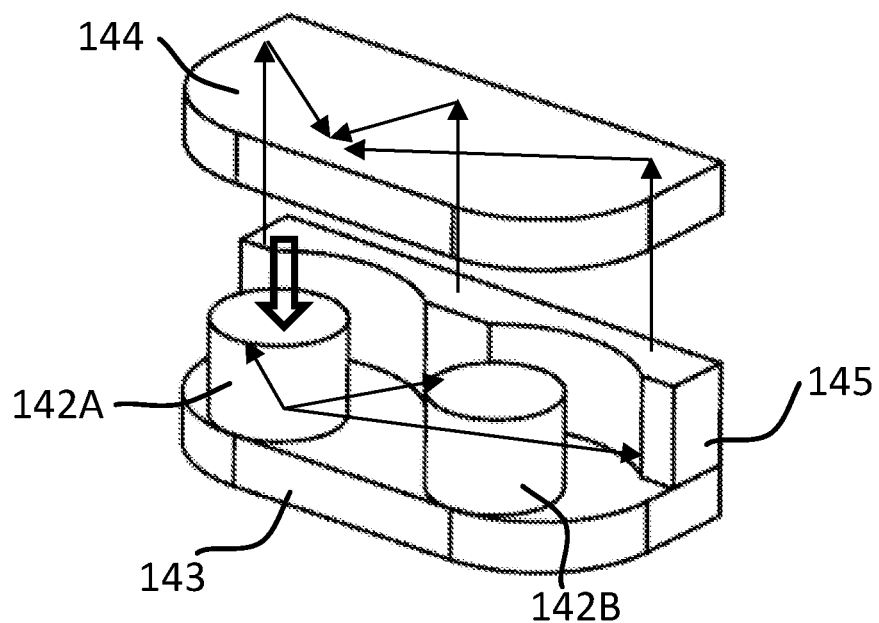
FIGS. 3C and 3D illustrate schematic diagrams of closed magnetic paths formed by high-frequency magnetic fluxes on the integrated inductor of FIG. 3A.
Figure 3D:
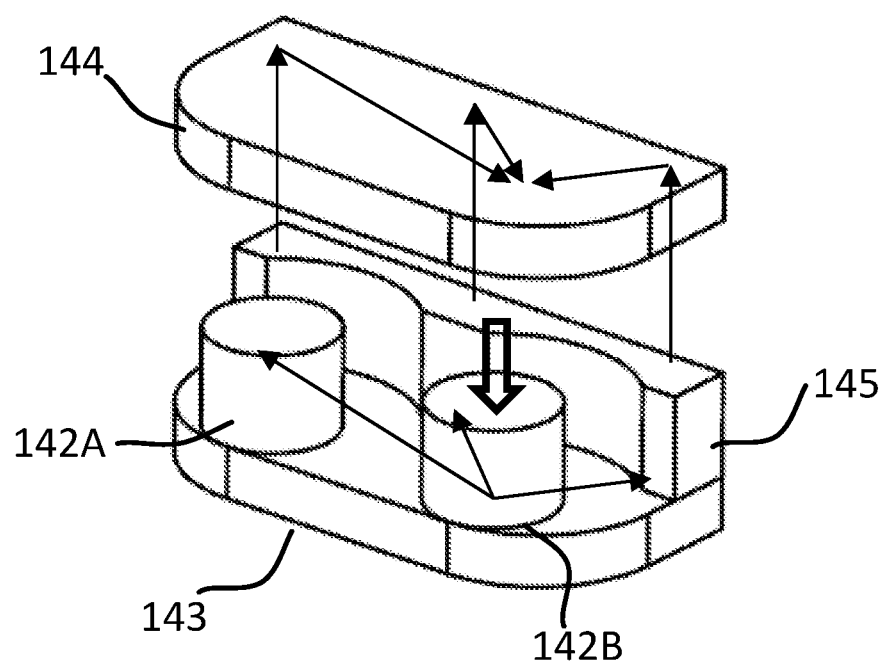

The two windings 141A and 141B are respectively wound on the two winding columns 142A and 142B, and line frequency current components of currents $I_A$ and $I_B$ flowing through the windings 141A and 141B surround the winding columns 142A and 142B in the same direction. For example, the line frequency current component of the current $I_A$ surrounds the winding column 142A along a clockwise direction, and the line frequency current component of the current $I_B$ also surrounds the winding column 142B along a clockwise direction. Therefore, magnetic fluxes generated by the currents $I_A$ and $I_B$ flowing through the windings 141A and 141B flow through closed magnetic paths formed by the winding columns 142A and 142B wound by the windings, the first cover plate 143, the common column 145 and the second cover plate 144, as shown in FIGS. 3C and 3D. Arrows in FIG. 3C indicate the closed magnetic path formed by the high-frequency magnetic flux generated by the current $I_A$ in the winding 141A wound on the winding column 142A, and arrows in FIG. 3D indicate the closed magnetic path formed by the high-frequency magnetic flux generated by the current $I_B$ in the winding 141B wound on the winding column 142B.

In the examples shown in FIGS. 3A-3D, phases of high-frequency current components of the currents $I_A$ and $I_B$ flowing through the two windings 141A and 141B are different, such as, differ by 180°, and a coupling coefficient between the two windings 141A and 141B is less than 0.1, i.e., both are in a weak coupling relationship.

Figure 3E:
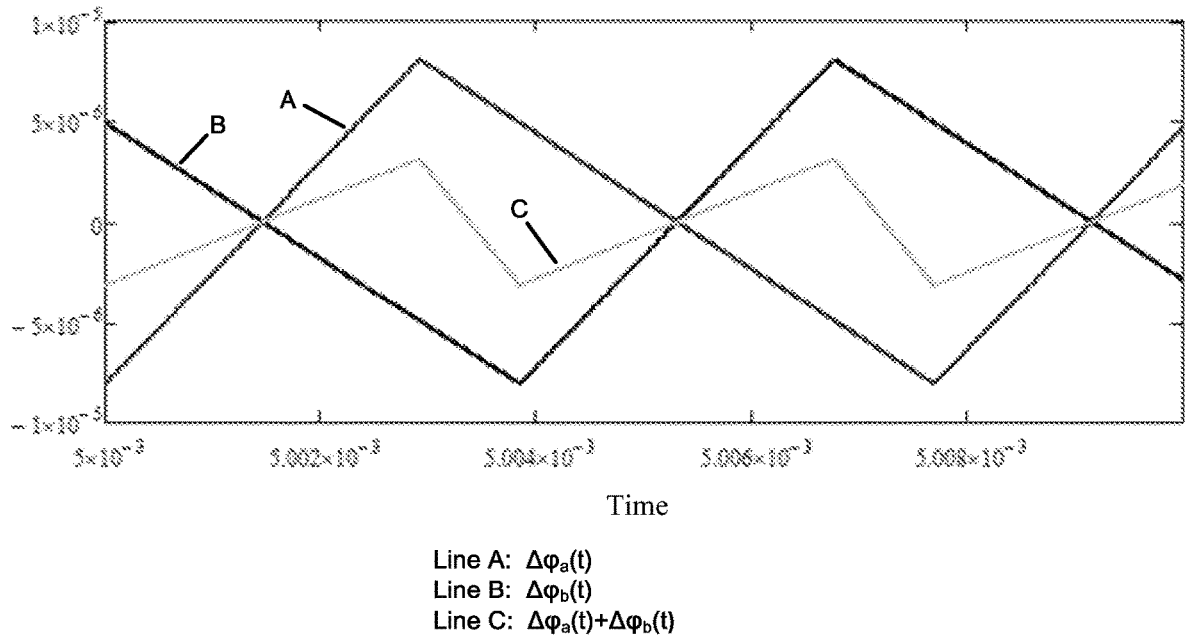
FIG. 3E illustrates a schematic diagram of variation of the high-frequency magnetic fluxes on the integrated inductor of FIG. 3A.

FIG. 3E illustrates a schematic diagram of variation of the high-frequency magnetic fluxes generated by the currents $I_A$ and $I_B$ flowing through the windings 141A and 141B. As shown in FIG. 3E, line A indicates variation with time of the high-frequency magnetic flux generated by the current $I_A$ flowing through the winding 141A, i.e., $\Delta\varphi_a(t)$, line B indicates variation with time of the high-frequency magnetic flux generated by the current $I_B$ flowing through the winding 141B, i.e., $\Delta\varphi_b(t)$, and line C indicates variation with time of an overlapped magnetic flux at the first cover plate 143, the second cover plate 144 and the common column 145 of the high-frequency magnetic fluxes generated by the currents $I_A$ and $I_B$ flowing through the windings 141A and 141B, i.e., $\Delta\varphi_a(t)+\Delta\varphi_b(t)$.

Since the phases of the high-frequency current components of the currents $I_A$ and $I_B$ flowing through the windings 141A and 141B are different, the magnetic fluxes $\Delta\varphi_a(t)$ and $\Delta\varphi_b(t)$ offset each other, thereby reducing a magnitude of overlapped magnetic flux $\Delta\varphi_a(t)+\Delta\varphi_b(t)$ at the first cover plate 143, the second cover plate 144 and the common column 145, and reducing the magnetic core loss. For example, phase difference between the high-frequency current components of the currents $I_A$ and $I_B$ flowing through the windings 141A and 141B is preferably 180°, and offset effect of the high-frequency magnetic fluxes is maximum, and the magnetic core loss can be greatly reduced.

Moreover, since the common column 145 is formed as a rectangular shape extending from the winding column 142A to the winding column 142B, and the first cover plate 143 and the second cover plate 144 are integrated rectangular shapes, as shown in FIGS. 3C and 3D, the closed magnetic paths of the high-frequency magnetic fluxes spread over almost the entire first cover plate 143, the second cover plate 144 and the common column 145, thereby further reducing a magnetic flux density on the first cover plate 143, the second cover plate 144 and the common column 145, and further reducing the magnetic core loss.

Figure 3F:
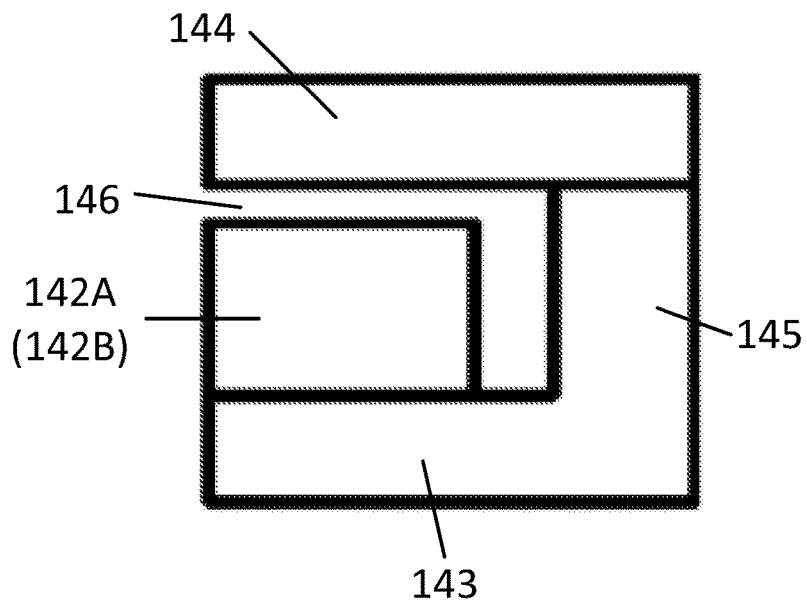
FIG. 3F illustrates a side view of the integrated inductor in FIG. 3A.

In this example, a coupling coefficient between the windings 141A and 141B is less than 0.1, i.e., both are in a weak coupling relationship. To realize the above coupling coefficient, one method is to provide an air gap in the winding columns 142A and 142B. For example, FIG. 3F illustrates an air gap 146 on a top of the winding columns 142A and 142B, and the winding columns 142A and 142B are spaced apart from the second cover plate 144 via the air gap 146. In other examples, the air gap also can be located at a bottom of the winding columns, such that the winding columns are spaced apart from the first cover plate via the air gap. In other examples, the air gap also can be provided in the center of each winding column.

Figure 4A:
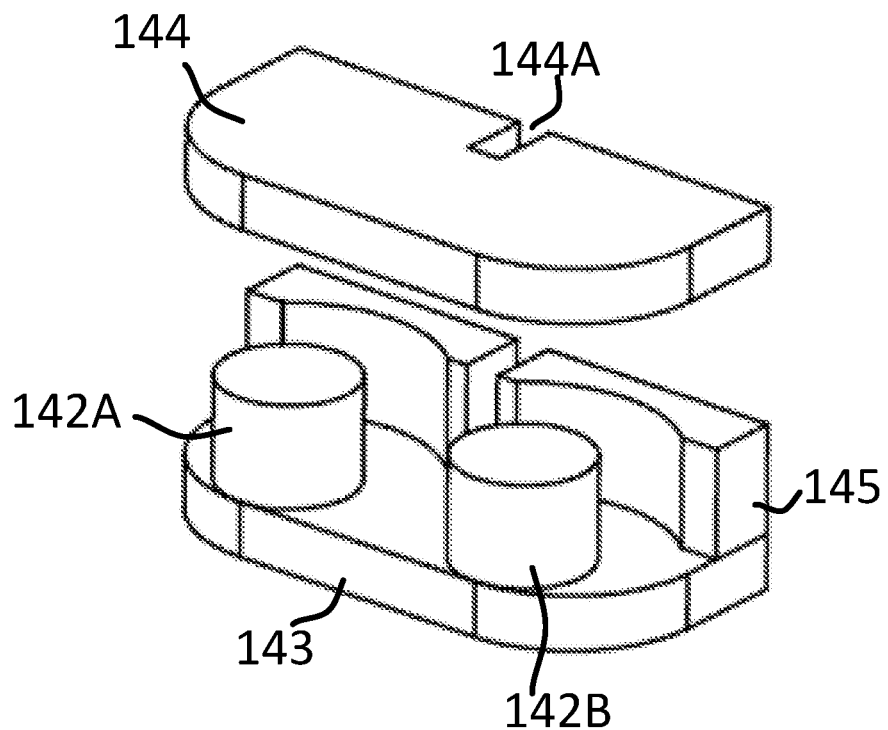
FIG. 4A illustrates a first variation example of the integrated inductor in FIG. 3A.
Figure 4B:
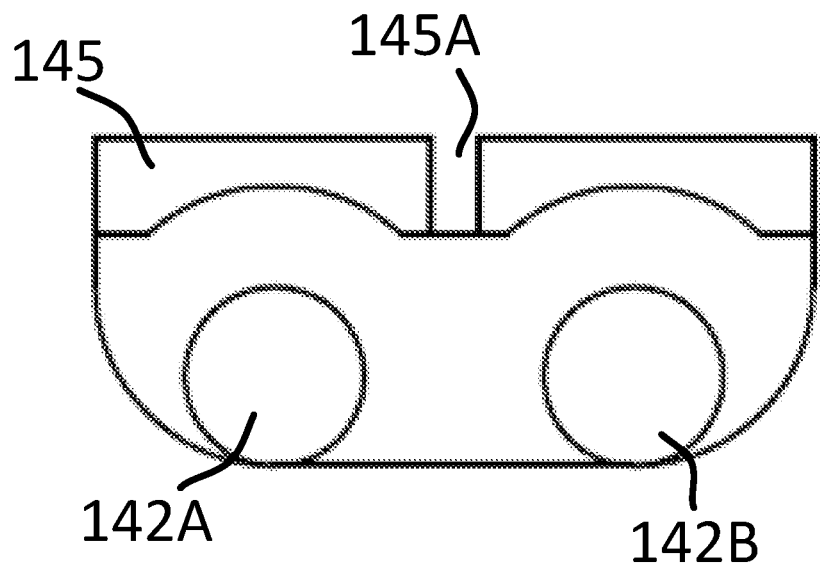
FIG. 4B illustrates a top view of the integrated inductor in FIG. 4A.

The inventor finds that magnetic fluxes at center positions of the common column 145, the first cover plate 143 and the second cover plate 144 are quite few, and even if such portion is hollowed out, there is almost no influence on the magnetic core loss. As shown in FIGS. 4A and 4B, in some examples, the common column 145 can be hollowed out at the center position to form a notch 145A (in the case of having two winding columns 142A and 142B, the center position of the common column 145 corresponds to a position between the winding columns 142A and 142B), as shown in FIG. 4B, thereby enhancing heat dissipation capability of the magnetic core in the case of not producing large influence on the magnetic core loss. Additionally or alternatively, at least one of the first cover plate 143 and the second cover plate 144 also can be hollowed out at the center position to form a notch (in the case of having two winding columns 142A and 142B, the center position of the first cover plate 143 and the second cover plate 144 corresponds to a position between the winding columns 142A and 142B). For example, FIG. 4A illustrates a notch 144A formed on the second cover plate 144.

Figure 4C:
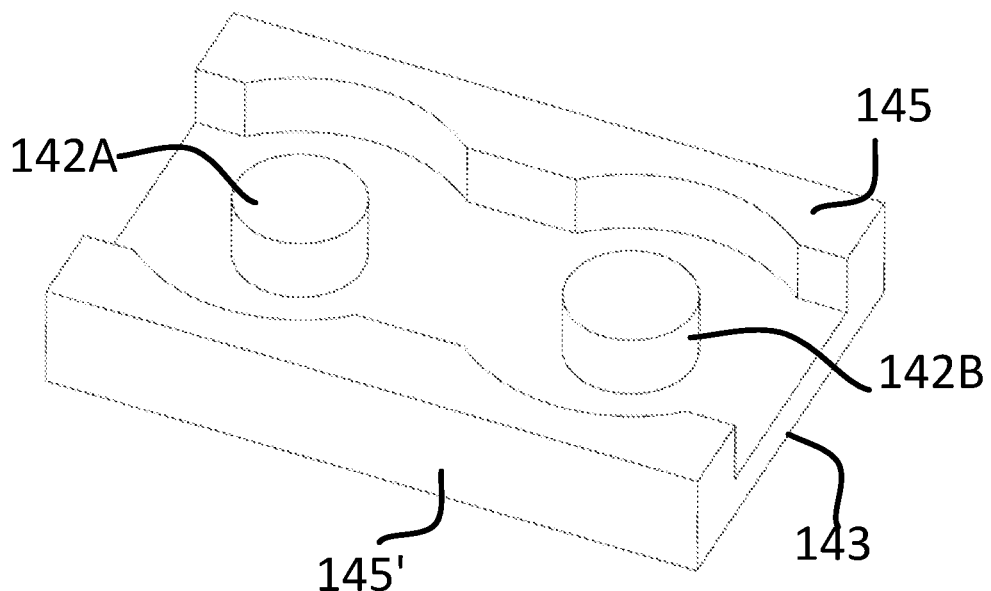
FIG. 4C illustrates a second variation example of the integrated inductor in FIG. 3A.
Figure 4D:
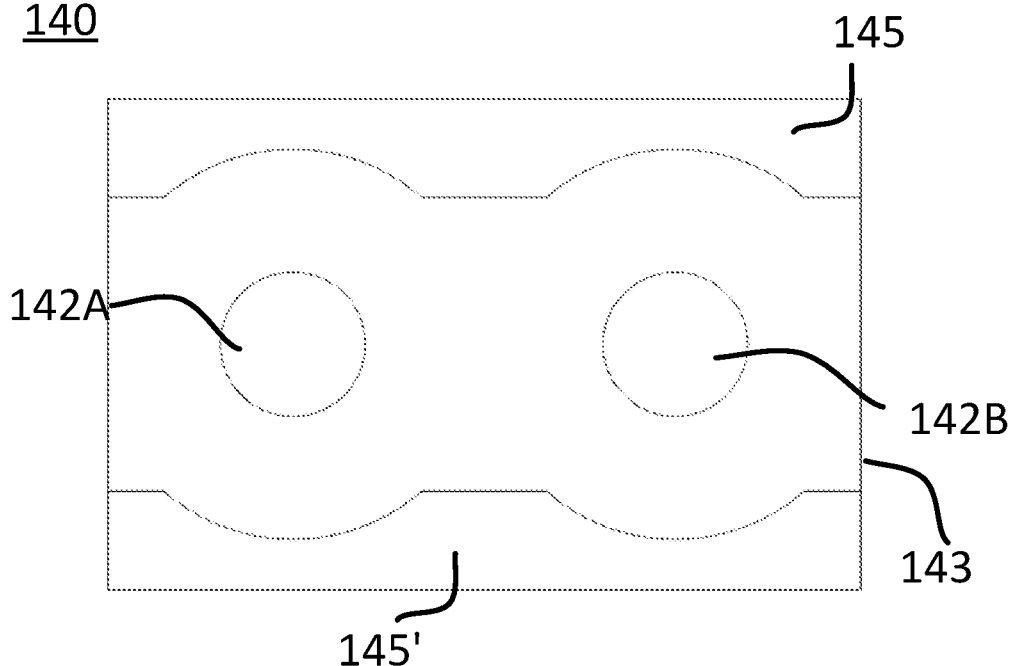
FIG. 4D illustrates a top view of the integrated inductor in FIG. 4C.

Moreover, although the above example describes a single common column on one side of the winding columns 142A and 142B, the application is not limited thereto. As shown in FIGS. 4C and 4D, except forming the common column 145 on a first side of the winding columns 142A and 142B, a common column 145' also can be formed on a second side of the winding columns 142A and 142B, where the second side is opposite to the first side. The common column 145' has a similar structure as the common column 145, except of different positions. Therefore, in the case that the common column 145 and the common column 145' are provided simultaneously on both sides of the winding columns 142A and 142B, the closed magnetic paths of the high-frequency magnetic fluxes spread over almost the entire first cover plate 143, the second cover plate 144, the common column 145 and the common column 145', thereby further reducing a magnetic flux density on respective components of the integrated inductor, and further reducing the magnetic core loss.

Figure 4E:
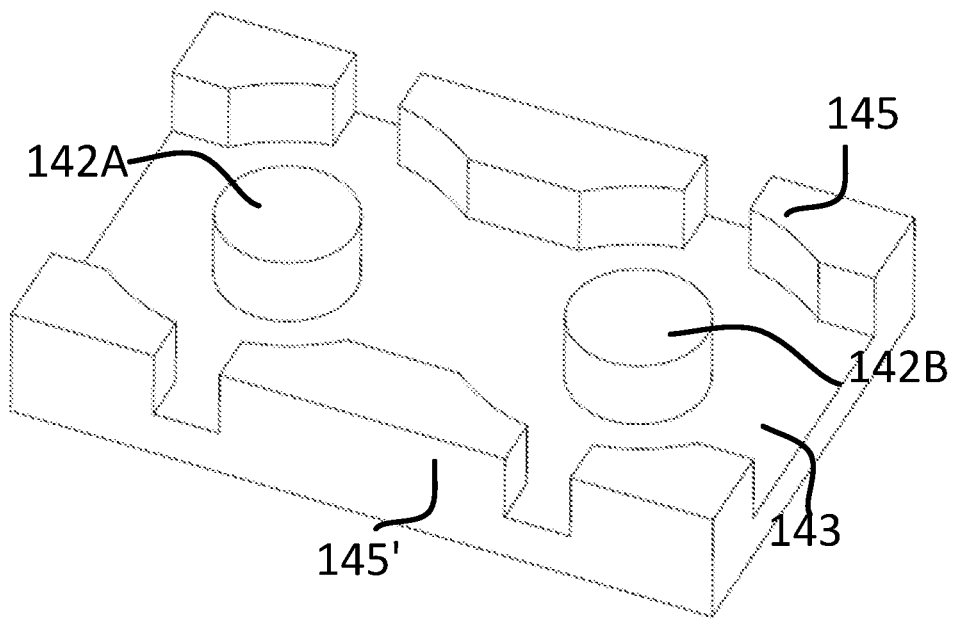
FIG. 4E illustrates a third variation example of the integrated inductor in FIG. 3A.
Figure 4F:
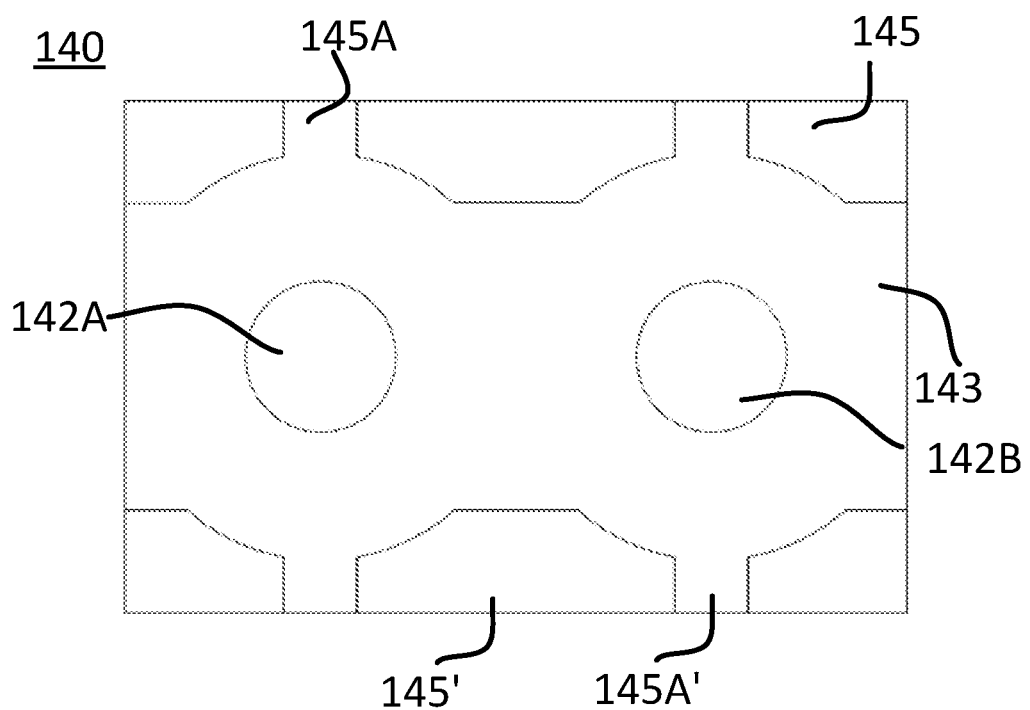
FIG. 4F illustrates a top view of the integrated inductor in FIG. 4E.

Meanwhile, similarly with the notch 145A formed on the common column 145 shown in FIGS. 4A and 4B, in the case that the common column 145 and the common column 145' are provided simultaneously on both sides of the winding columns 142A and 142B, notches 145A and 145A' can be further respectively formed on the common column 145 and 145', as shown in FIGS. 4E-4F, thereby enhancing heat dissipation capability of the magnetic core in the case of not producing large influence on the magnetic core loss. It is worth noting that the application does not limit position and number of the notches on the common column. For example, on one common column, the number of the notches can be one, and disposed in the center of the common column, and two or more notches also can be disposed on one common column. Of course, the application also does not limit position and number of the notches on the first cover plate and the second cover plate.

SECOND EXAMPLE

Figure 5:
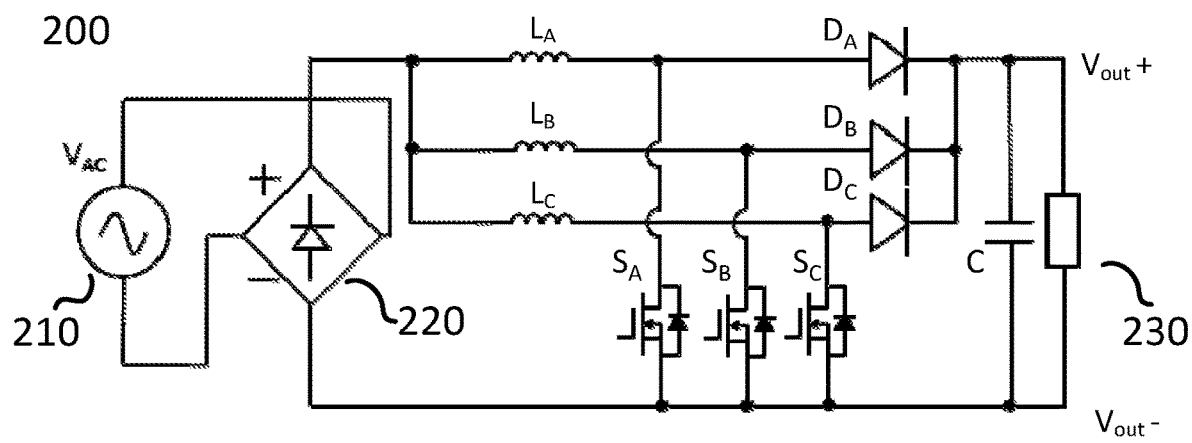
FIG. 5 illustrates a circuit diagram of a power module according to a second example of the application.

Please refer to FIG. 5, it illustrates a circuit diagram of a power module 200 according to the second example of the application. The power module 200 has an input end 210, a rectifier circuit 220, an output end 230 and multiple, such as, three Boost circuits connected in parallel. The input end 210 includes a positive electrode $V_{AC}+$ and a negative electrode $V_{AC}-$, and the output end 230 includes a positive electrode $V_{out}+$ and a negative electrode $V_{out}-$. The input end 210 is configured to receive an input voltage $V_{AC}$ from a single-phase high-frequency power supply, the output end 230 is configured to supply an output voltage $V_{out}$, and the rectifier circuit 220 is electrically connected to the input end 210. The multiple Boost circuits are connected between the rectifier circuit 220 and the output end 230.

The power module 200 shown in FIG. 5 has three Boost circuits connected in parallel, and each of the Boost circuits includes a switch, a diode and an inductor. For example, as shown in FIG. 5, the first Boost circuit in the three Boost circuits connected in parallel consists of a switch $S_A$, a diode $D_A$ and an inductor $L_A$, the second Boost circuit consists of a switch $S_B$, a diode $D_B$ and an inductor $L_B$, and the third Boost circuit consists of a switch $S_C$, a diode $D_C$ and an inductor $L_C$.

Similarly with the first example, in each of the three Boost circuits, a first end of the inductor is electrically connected to the rectifier circuit 220, a second end of the inductor, a first end of the switch and a first end of the diode are electrically connected together, a second end of the switch is electrically connected to the negative electrode $V_{out}-$ of the output end 230, and a second end of the diode is electrically connected to the positive electrode $V_{out}+$ of the output end 230.

The inductors $L_A$ to $L_C$ in the three Boost circuits function as PFC inductors of the power module 200, and currents flowing through the inductors $L_A$ to $L_C$ have line frequency current components and high-frequency current components, where the directions of the line frequency current components of the inductors $L_A$ to $L_C$ are the same.

As stated previously, if windings in the inductors $L_A$ to $L_C$ are wound on the winding columns of the current integrated inductor, when high-frequency current components of the currents flowing through the inductors $L_A$ to $L_C$ are of high frequency (e.g., greater than 100 kHz), the magnetic core loss is large.

Figure 6A:
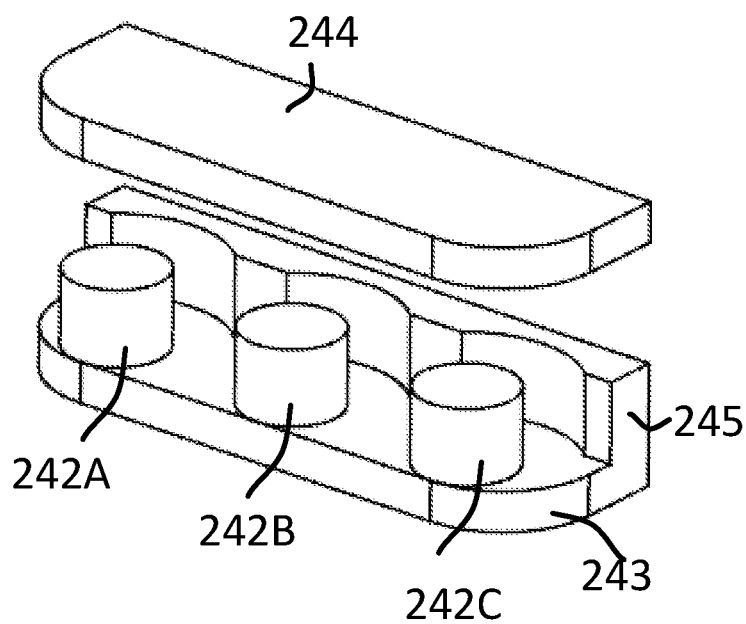
FIG. 6A illustrates an exploded diagram of an integrated inductor applied to the power module in FIG. 5.
Figure 6B:
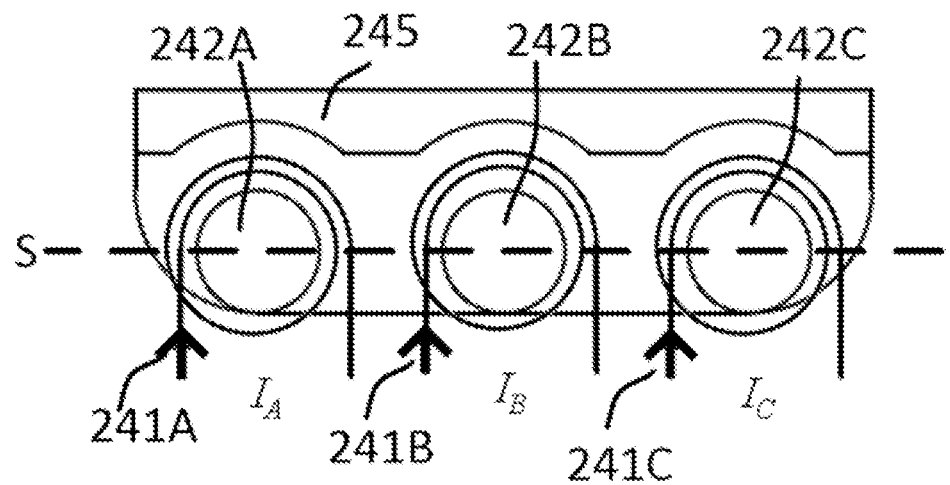
FIG. 6B illustrates a top view of the integrated inductor in FIG. 6A.

FIG. 6A illustrates an exploded diagram of an integrated inductor 240 applied to the power module 200 shown in FIG. 5. FIG. 6B illustrates a top view of the integrated inductor 240, where a second cover plate 244 is omitted. The integrated inductor 240 functions as the inductors $L_A$, $L_B$ and $L_C$ in the power module 200, i.e., three integrated PFC inductors.

The integrated inductor 240 has a magnetic core and three windings 241A, 241B and 241C. The magnetic core includes three winding columns 242A, 242B and 242C, a first cover plate 243 disposed at a bottom of the winding columns 242A to 242C, a second cover plate 244 disposed at a top of the winding columns 242A to 242C, and opposite to the first cover plate 243, and a common column 245. The three winding columns 241A, 241B and 241C are in parallel, and provided with air gaps. Since the power module 200 has three inductors $L_A$ to $L_C$, the three windings 241A to 241C respectively correspond to the inductors $L_A$ to $L_C$. The three winding columns 242A to 242C are arranged sequentially along line S, and are connected between the first cover plate 243 and the second cover plate 244. In the integrated inductor 240, the common column 245 is connected between the first cover plate 243 and the second cover plate 244, and is located on one side of the winding columns 242A to 242C (or the line S). The common column 245 is formed as a substantial rectangular shape to extend from a position corresponding to the first winding column 242A of the three winding columns 242A to 242C (i.e., a lateral position of the winding column 242A) to a position corresponding to the last winding column 242C of the three winding columns 242A to 242C (i.e., a lateral position of the winding column 242C).

The three windings 241A to 241C are respectively wound on the three winding columns 242A to 242C, and line frequency current components of currents $I_A$, $I_B$ and $I_C$ flowing through the three windings 241A to 241C surround the winding columns 242A to 242C in the same direction. Therefore, high-frequency magnetic fluxes generated by the currents $I_A$, $I_B$ and $I_C$ flowing through the windings 241A to 241C flow through closed magnetic paths formed by the winding columns 242A, 242B and 242C wound by the windings, the first cover plate 243, the common column 245 and the second cover plate 244.

In the example shown in FIGS. 6A-6B, phases of high-frequency current components of the currents $I_A$, $I_B$ and $I_C$ flowing through the windings 241A to 241C are different, such as, differ by 120°, and a coupling coefficient between two of the windings 241A to 241C is less than 0.1, i.e., they are in a weak coupling relationship.

Figure 6C:
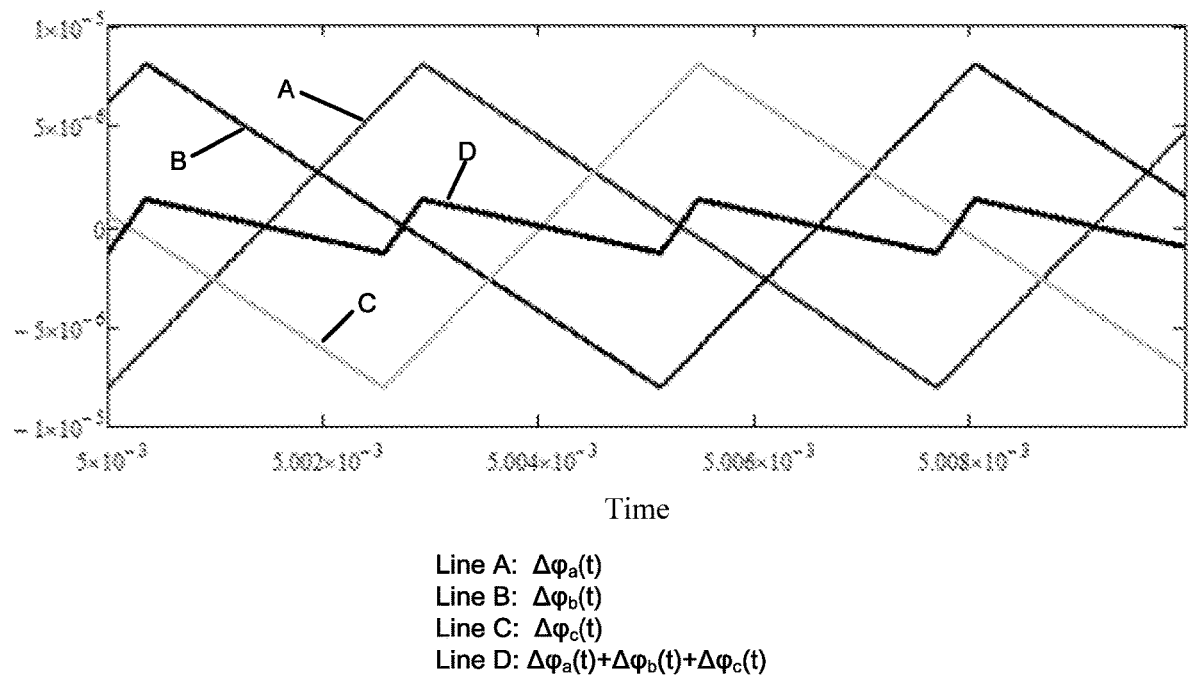
FIG. 6C illustrates a schematic diagram of variation of high-frequency magnetic fluxes on the integrated inductor of FIG. 6A.

FIG. 6C illustrates a schematic diagram of variation of the high-frequency magnetic fluxes generated by the currents $I_A$, $I_B$ and $I_C$ flowing through the windings 241A to 241C. As shown in FIG. 6C, line A indicates variation with time of the high-frequency magnetic flux generated by the current $I_A$ flowing through the winding 241A, i.e., $\Delta\varphi_a(t)$, line B indicates variation with time of the high-frequency magnetic flux generated by the current $I_B$ flowing through the winding 241B, i.e., $\Delta\varphi_b(t)$, line C indicates variation with time of the high-frequency magnetic flux generated by the current $I_C$ flowing through the winding 241C, i.e., $\Delta\varphi_c(t)$, and line D indicates variation with time of an overlapped magnetic flux at the first cover plate 243, the second cover plate 244 and the common column 245 of the high-frequency magnetic fluxes generated by the currents $I_A$, $I_B$ and $I_C$ flowing through the windings 241A to 241C, i.e., $\Delta\varphi_a(t)+\Delta\varphi_b(t)+\Delta\varphi_c(t)$.

Since phases of the high-frequency current components of the currents $I_A$, $I_B$ and $I_C$ flowing through the windings 241A to 241C are different, the magnetic fluxes $\Delta\varphi_a(t)$, $\Delta\varphi_b(t)$ and $\Delta\varphi_c(t)$ offset each other, thereby reducing a magnitude of overlapped magnetic flux $\Delta\varphi_a(t)+\Delta\varphi_b(t)+\Delta\varphi_c(t)$ at the first cover plate 243, the second cover plate 244 and the common column 245, and reducing the magnetic core loss. For example, phase difference between the high-frequency current components of the currents $I_A$, $I_B$ and $I_C$ flowing through the windings 241A to 241C is preferably 120°, and offset effect of the high-frequency magnetic fluxes is maximum, so the magnetic core loss can be greatly reduced.

Moreover, since the common column is formed to be a rectangular shape extending from the winding column 242A to the winding column 242C, the closed magnetic paths of the high-frequency magnetic fluxes spread over almost the entire first cover plate 243, the second cover plate 244 and the common column 245, thereby further reducing a magnetic flux density on the first cover plate 243, the second cover plate 244 and the common column 245, and further reducing the magnetic core loss.

In some examples, a coupling coefficient between two of the windings 241A to 241C is less than 0.1, i.e., they are in a weak coupling relationship. To realize the above coupling coefficient, an air gap can be provided in the winding columns 242A to 242C. For example, the air gap can be provided on a top of the winding columns 242A to 242C, and the winding columns 242A to 242C are spaced apart from the second cover plate 244 via the air gap. In other examples, the air gap also can be located at a bottom of the winding columns, such that the winding columns are spaced apart from the first cover plate 243 via the air gap. In other examples, the air gap also can be provided in the center of each winding column.

Figure 6D:
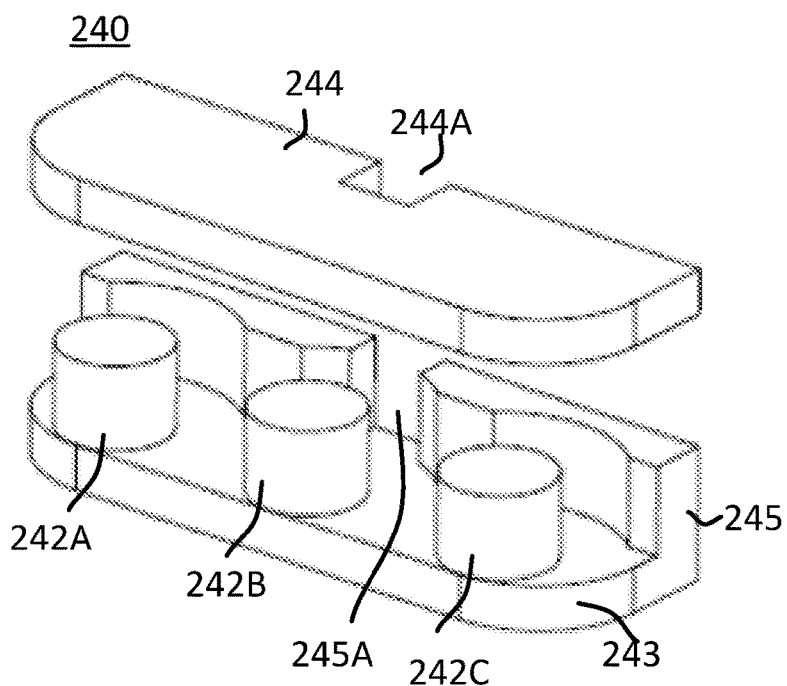
FIG. 6D illustrates a variation example of the integrated inductor in FIG. 6A.

Similarly, since the inventor finds that magnetic fluxes at center positions of the common column 245, the first cover plate 243 and the second cover plate 244 (e.g., in the case of having the winding columns 242A, 242B and 242C, the center positions of the common column 245, the first cover plate 243 and the second cover plate 244 correspond to a position adjacent to the winding column 242B) are quite few, and even if this portion is hollowed out, there is almost no influence on the magnetic core loss. Therefore, as shown in FIG. 6D, in some examples, the common column 245 can be hollowed out at the center position to form a notch 245A, thereby enhancing heat dissipation capability of the magnetic core in the case of not producing large influence on the magnetic core loss. Additionally or alternatively, at least one of the first cover plate 243 and the second cover plate 244 also can be hollowed out at the center position to form a notch 244A.

Moreover, although the integrated inductor 240 illustrates having a single common column 245 on one side of the winding columns 242A, 242B and 242C, the application is not limited thereto. Common columns also can be disposed on both sides of the winding columns 242A, 242B and 242C, thereby further reducing a magnetic flux density on respective components of the integrated inductor, and further reducing the magnetic core loss.

THIRD EXAMPLE

The foregoing disclosures illustrate a power module having two Boost circuits and an integrated inductor having two winding columns with reference to FIGS. 2-4F, and illustrate a power module having three Boost circuits and an integrated inductor having three winding columns with reference to FIGS. 5-6D. It shall be understood that the number of Boost circuits connected in parallel in the power module can be further expanded to three or more, and correspondingly, the number of winding columns in the integrated inductor also can be further expanded to three or more.

Figure 7:
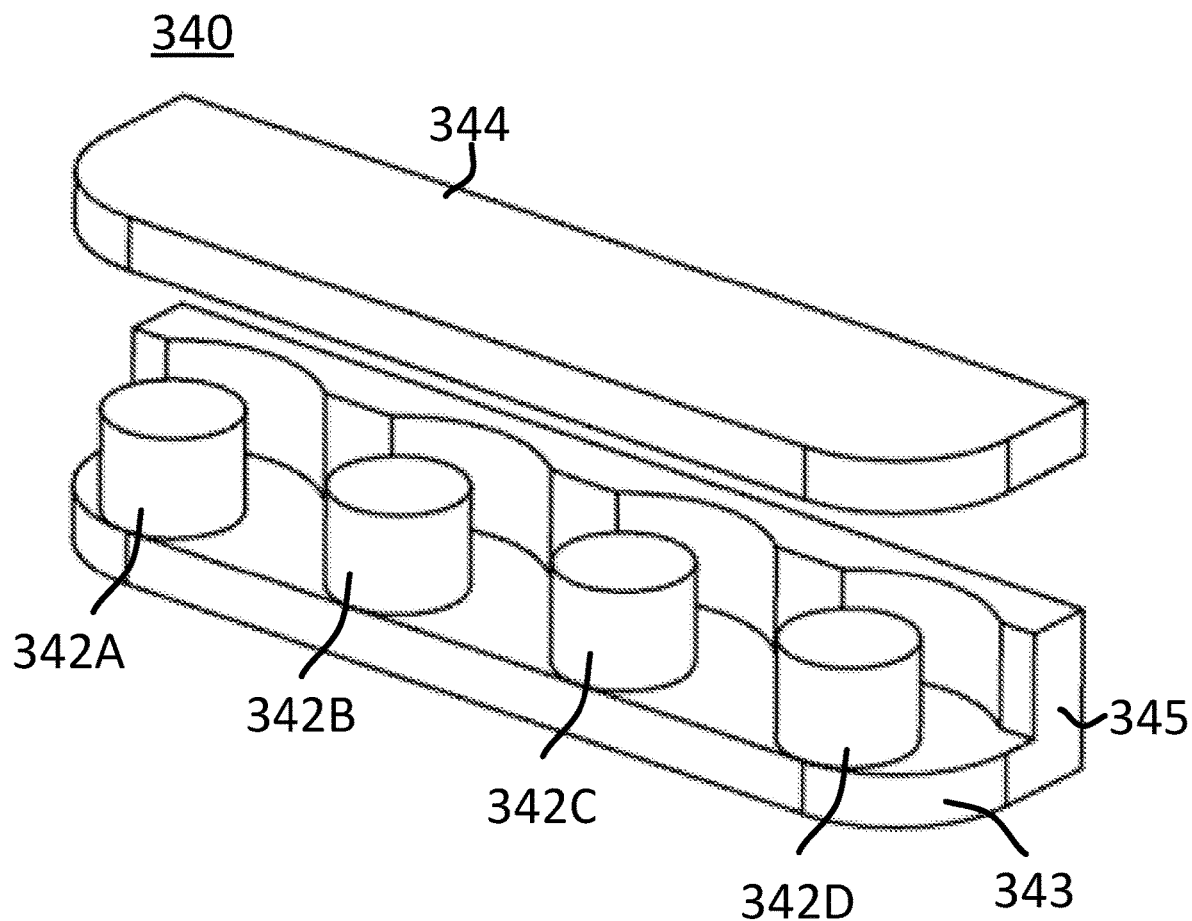
FIG. 7 illustrates an exploded diagram of an integrated inductor according to a third example of the application.

FIG. 7 illustrates an exploded diagram of an integrated inductor 340 according to a third example of the application. The integrated inductor 340 functions as four integrated PFC inductors in the power module.

The integrated inductor 340 has a magnetic core and four windings (not shown). The magnetic core includes four winding columns 342A, 342B, 342C and 342D, a first cover plate 343 disposed at a bottom of the winding columns 342A to 342D, a second cover plate 344 disposed at a top of the winding columns 342A to 342D, and opposite to the first cover plate 343, and a common column 345. The four winding columns 342A to 342D are in parallel, and provided with air gaps. Since the power module has four inductors, the four windings respectively correspond to the four inductors. The four winding columns 342A to 342D are arranged sequentially along a line, and connected between the first cover plate 343 and the second cover plate 344. In the integrated inductor 340, the common column 345 is connected between the first cover plate 343 and the second cover plate 344, and located on one side of the winding columns 342A to 342D. The common column 345 is formed as a substantial rectangular shape to extend from a position corresponding to the first winding column 342A of the four winding columns 342A to 342D (i.e., a lateral position of the winding column 342A) to a position corresponding to the last winding column 342D of the four winding columns 342A to 342D (i.e., a lateral position of the winding column 342D).

Although not shown, similarly with the first and second examples, the four windings are respectively wound on the winding columns 342A to 342D, and the directions of currents flowing through the four windings are the same. Therefore, high-frequency magnetic fluxes generated by the currents flowing through the four windings flow through a closed magnetic paths formed by the winding columns 342A, 342B, 342C and 342D wound by the windings, the first cover plate 343, the common column 345 and the second cover plate 344.

Although not shown, similarly with the first and second examples, phases of high-frequency current components of the currents flowing through the four windings are different, such as, differ by 90°. Therefore, since phases of the high-frequency current components of the currents flowing through the four windings are different, magnetic fluxes on the four paths offset each other, thereby reducing a magnitude of overlapped magnetic flux at the first cover plate 343, the second cover plate 344 and the common column 345, and reducing the magnetic core loss. For example, phase difference between the high-frequency current components of the currents flowing through the four windings are preferably 90°, and offset effect of the high-frequency magnetic fluxes is maximum, so the magnetic core loss can be greatly reduced.

Moreover, since the common column is formed to be a rectangular shape extending from the winding column 342A to the winding column 342D, the closed magnetic paths of the high-frequency magnetic fluxes spread over almost the entire first cover plate 343, the second cover plate 344 and the common column 345, thereby further reducing a magnetic flux density of the first cover plate 343, the second cover plate 344 and the common column 345, and further reducing the magnetic core loss.

Similarly with the first and second examples, it is possible that a coupling coefficient between two of the four windings is less than 0.1 by providing an air gap, i.e., the four windings are in a weak coupling relationship. The details are not described here.

Further, similarly with the first and second examples, heat dissipation capability can be enhanced by forming notches on the first cover plate 343, the second cover plate 344 and/or the common column 345 in the case of not producing large influence on the magnetic core loss. The details are not described here.

Moreover, although the integrated inductor 340 illustrates having a single common column 345 on one side of the winding columns 342A to 342D, the application is not limited thereto. Common columns also can be provided on both sides of the winding columns 342A to 342D, thereby further reducing a magnetic flux density on respective components of the integrated inductor, and further reducing the magnetic core loss.

To sum up, in some examples, a circuit of the power module may have an input end, a rectifier circuit, an output end and multiple Boost circuits connected in parallel. The input end is configured to receive an input voltage $V_{AC}$ from a single-phase high-frequency power supply, the output end is configured to supply an output voltage $V_{out}$, and the rectifier circuit is electrically connected to the input end. The multiple Boost circuits are connected between the rectifier circuit and the output end.

The multiple Boost circuits can have N Boost circuits connected in parallel, where N is an integer greater than or equal to 3. Each of the N Boost circuits includes a switch, a diode and an inductor. Similarly with the first and second examples, in each of the N Boost circuits, a first end of the inductor is electrically connected to the rectifier circuit, a second end of the inductor, a first end of the switch and a first end of the diode are electrically connected together, a second end of the switch is electrically connected to a negative electrode of the output end, and a second end of the diode is electrically connected to a positive electrode of the output end. The inductor in each Boost circuit functions as a PFC inductor in the power module, and a current flowing through the inductor has a line frequency current component and a high-frequency current component, where the direction of the line frequency current component of the inductor in each Boost circuit is the same.

The integrated inductor applied to the power module having N Boost circuits has a magnetic core and N corresponding windings. The magnetic core includes N corresponding winding columns, a first cover plate disposed at a bottom of the N winding columns, a second cover plate disposed at a top of the N winding columns, and opposite to the first cover plate, and a common column. The N windings correspond to N inductors, respectively. The N winding columns are arranged sequentially along a line, and between the first cover plate and the second cover plate, and the N winding columns are in parallel, and provided with air gaps. In the integrated inductor, the common column is connected between the first cover plate and the second cover plate, and is located on one side or both sides of the N winding columns. The common column is formed as a substantial rectangular shape to extend from a position corresponding to the first winding column of the N winding columns (i.e., a lateral position of the first winding column) to a position corresponding to the last winding column of the N winding columns (i.e., a lateral position of the last winding column).

The N windings are respectively wound on the N winding columns in the same direction (e.g., a clockwise direction or an anticlockwise direction), and directions of currents flowing through the N windings (i.e., the N inductors) are the same. Therefore, high-frequency magnetic fluxes generated by the currents flowing through the N windings flow through a closed magnetic paths formed by the N winding columns wound by the windings, the first cover plate, the common column and the second cover plate. In some examples, the common column is connected between the first cover plate and the second cover plate, and a magnetic path formed by the first cover plate, the second cover plate and the common column does not have an air gap.

In this example, phases of high-frequency current components of the currents flowing through the N windings are different, such as, differ by 360°/N. A coupling coefficient between two of the N windings is less than 0.1, i.e., the N windings are in a weak coupling relationship. Since phases of the high-frequency current components of the currents flowing through the N windings are different, magnetic fluxes on the N paths offset each other, thereby reducing a magnitude of overlapped magnetic flux at the first cover plate, the second cover plate and the common column, and reducing the magnetic core loss. For example, phase difference between the high-frequency current components of the currents flowing through the N windings are preferably 360°/N, and offset effect of the high-frequency magnetic fluxes is maximum, so the magnetic core loss can be greatly reduced.

Moreover, since the common column is formed to be a rectangular shape extending from the first winding column to the last winding column, the closed magnetic paths of the high-frequency magnetic fluxes spread over almost the entire first cover plate, the second cover plate and the common column, thereby further reducing a magnetic flux density of the first cover plate, the second cover plate and the common column, and further reducing the magnetic core loss.

Moreover, similarly with the first and second examples, in order to realize a low coupling coefficient between two of the N windings, the air gap can be formed at one end and/or in the center of the N winding columns.

Moreover, similarly with the first and second examples, in order to enhance heat dissipation capability in the case of not producing influence on the magnetic core loss, a notch can be formed on at least one of the common column, the first cover plate and the second cover plate.

To sum up, the invention provides a novel integrated inductor. The integrated inductor integrates N inductors (N is greater than or equal to 3) wound on the N winding columns arranged sequentially and having a phase shift of 360/N°, and can reduce a high-frequency magnetic flux density through overlap effect of the magnetic fluxes on the cover plate of the integrated inductor, thereby reducing the magnetic core loss. Moreover, since the common column of the integrated inductor is formed as a rectangular shape extending from the first winding column to the last winding column of the N winding columns, the closed magnetic paths of the high-frequency magnetic fluxes spread over almost the entire cover plates and the common column, thereby further reducing the high-frequency magnetic flux density of the cover plates and the common column, and further reducing the magnetic core loss. Meanwhile, all inductors are in a weak coupling relationship, and can work independently, thereby avoiding interference of leakage magnetic flux on other electrical components.

Although the disclosures explain the embodiments of the invention, it is assumed of other and further embodiments of the invention without departing from basic extent of the invention. For example, elements or structures without mutually exclusive in different embodiments can be combined to form further embodiment, and the extent of the application is determined by the appended claims.

What is claimed is:

1. An integrated inductor, comprising:
   a magnetic core, comprising:
     two winding columns being in parallel;
     a first cover plate disposed at a bottom of the two winding columns;
     a second cover plate disposed at a top of the two winding columns, and opposite to the first cover plate; and
     a common column connected between the first cover plate and the second cover plate, and disposed on one side or both sides of the two winding columns; and
   two windings respectively wound on the two winding columns, and a current flowing through each of the two windings comprises a line frequency current component and a high-frequency current component, wherein the integrated inductor is applied in a switching power supply circuit comprising a switch, wherein the line frequency current component is an intrinsic current component of the switching power supply circuit according to a load, and the high-frequency current component is a ripple current component induced by operation of the switch, wherein the two windings are wound on the two winding columns in either a clockwise direction or a counterclockwise direction, and the line frequency current component of the current flowing through each of the two windings generates magnetic flux in a same direction within the two winding columns, a phase difference between the high-frequency current component of the current flowing through each of the two windings is 180°, the switching power supply circuit further comprises a control unit configured to control the operation of the switch, such that the high-frequency current component of the current flowing through each of the two windings is 180°, and the common column without air-gap configured to significantly decrease the magnetic reluctance of the common column, but each winding column is provided with an air gap configured to increase magnetic reluctance of the winding column, thereby reducing the shared magnetic flux between the two windings such that a coupling coefficient between the two windings is less than 0.1.

2. The integrated inductor according to claim 1, wherein the common column extends from a position corresponding to the first winding column of the two winding columns to a position corresponding to the last winding column of the two winding columns.

3. The integrated inductor according to claim 1, wherein the common column is an integrated rectangular shape, or the common column is formed with a notch.

4. The integrated inductor according to claim 3, wherein the first cover plate and the second cover plate are both integrated rectangular shapes, or the first cover plate and the second cover plate are both formed with notches.

5. The integrated inductor according to claim 1, wherein the integrated inductor functions as two integrated PFC inductors.

6. A power module, comprising an input end, a rectifier circuit, two Boost circuits and an output end;
   wherein the input end is configured to receive an input voltage, the output end is configured to output an output voltage, the rectifier circuit is electrically connected to the input end, and the two Boost circuits are connected in parallel, and electrically connected between the rectifier circuit and the output end;
   wherein the two Boost circuits comprise the integrated inductor according to claim 1.

7. The power module according to claim 6, wherein each of the Boost circuits comprises a switch, a diode and one inductor in the integrated inductor;
   in each of the Boost circuits, a first end of the inductor is electrically connected to the rectifier circuit; a second end of the inductor, a first end of the switch and a first end of the diode are electrically connected together; a second end of the switch is electrically connected to a negative electrode of the output end; and a second end of the diode is electrically connected to a positive electrode of the output end.

8. An integrated inductor, comprising:
   a magnetic core, comprising:
     N winding columns being in parallel, where N is an integer greater than or equal to 3;
     a first cover plate disposed at a bottom of the multiple winding columns;
     a second cover plate disposed at a top of the multiple winding columns, and opposite to the first cover plate; and
     a common column connected between the first cover plate and the second cover plate, disposed on one side or both sides of the N winding columns, and extending from a position corresponding to the first winding column of the N winding columns to a position of the last winding column of the N winding columns; and N windings respectively wound on the N winding columns, and a current flowing through each of the N windings comprises a line frequency current component and a high-frequency current component, wherein the integrated inductor is applied in a switching power supply circuit comprising a switch, wherein the line frequency current component is an intrinsic current component of the switching power supply circuit according to a load, and the high-frequency current component is a ripple current component induced by operation of the switch, wherein the N windings are wound on the N winding columns in either a clockwise direction or a counterclockwise direction, and the line frequency current component of the current flowing through each of the N windings generates magnetic flux in a same direction within the N winding columns, a phase difference between the high-frequency current component of the current flowing through each of the N windings is 360°/N, the switching power supply circuit further comprises a control unit configured to control the operation of the switch, such that the high-frequency current component of the current flowing through each of the N windings is 360°/N, and the common column without air-gap configured to significantly decrease the magnetic reluctance of the common column, but each winding column is provided with an air gap configured to increase magnetic reluctance of the winding column, thereby reducing shared magnetic flux between every pair of the N windings such that a coupling coefficient between every pair of the N windings is less than 0.1.

9. The integrated inductor according to claim 8, wherein N=3, and the phase difference between high-frequency current component of the current flowing through each of the three windings is 120°.

10. The integrated inductor according to claim 8, wherein the air gap is disposed in the center and/or at one end of each of the winding columns.

11. The integrated inductor according to claim 8, wherein the N winding columns are arranged sequentially along a straight line.

12. The integrated inductor according to claim 8, wherein the common column is an integrated rectangular shape, or the common column is formed with a notch.

13. The integrated inductor according to claim 12, wherein the first cover plate and the second cover plate are both integrated rectangular shapes, or the first cover plate and the second cover plate are both formed with notches.

14. The integrated inductor according to claim 8, wherein the integrated inductor functions as N integrated PFC inductors.

15. A power module, comprising an input end, a rectifier circuit, N Boost circuits and an output end;
wherein the input end is configured to receive an input voltage, the output end is configured to output an output voltage, the rectifier circuit is electrically connected to the input end, and the N Boost circuits are connected in parallel, and electrically connected between the rectifier circuit and the output end;
wherein the N Boost circuits comprise the integrated inductor according to claim 8.

16. The power module according to claim 15, wherein each of the Boost circuits comprises a switch, a diode and one inductor in the integrated inductor;
in each of the Boost circuits, a first end of the inductor is electrically connected to the rectifier circuit; a second end of the inductor, a first end of the switch and a first end of the diode are electrically connected together; a second end of the switch is electrically connected to a negative electrode of the output end; and a second end of the diode is electrically connected to a positive electrode of the output end.

* * * * *